United States Patent [19]

Johnson

[11] Patent Number: 5,461,807
[45] Date of Patent: Oct. 31, 1995

[54] ANIMAL EARTAG ELECTRONIC TRANSPONDER

[75] Inventor: George N. Johnson, Stillwater, Minn.

[73] Assignee: Fearing Manufacturing Company, South St. Paul, Minn.

[21] Appl. No.: 227,163

[22] Filed: Apr. 13, 1994

[51] Int. Cl.⁶ .................................................. A01K 11/00
[52] U.S. Cl. ................................................. 40/301; 40/300
[58] Field of Search .......................... 40/301, 300; 119/3; 606/117, 116

[56] References Cited

U.S. PATENT DOCUMENTS

| | | |
|---|---|---|
| 4,049,950 | 9/1977 | Byrne et al. . |
| 4,359,015 | 11/1982 | Ritchey . |
| 4,612,877 | 9/1986 | Hayes et al. . |
| 4,617,876 | 10/1986 | Hayes . |
| 4,635,389 | 1/1987 | Oudelette . |
| 4,653,208 | 3/1987 | Wassilieff . |
| 4,718,697 | 1/1988 | Berardus van Amelsfort . |
| 4,854,328 | 8/1989 | Pollack . |
| 4,857,893 | 8/1989 | Carroll . |
| 5,024,013 | 6/1991 | Hayes et al. . |
| 5,028,918 | 7/1991 | Giles et al. . |
| 5,211,129 | 5/1993 | Taylor et al. ............... 606/117 |
| 5,357,700 | 10/1994 | Schulte ........................ 40/301 |

FOREIGN PATENT DOCUMENTS 9322907  11/1993  WIPO .

Primary Examiner—Kenneth J. Dorner
Assistant Examiner—Cassandra Davis
Attorney, Agent, or Firm—Francis A. Sirr; Earl C. Hancock

[57] ABSTRACT

An animal eartag houses a passive electronic transponder for use in the identification of the animal by a low frequency radio wave reading system. The eartag is formed of a generally flat and flexible plastic body or carrier member that includes an ear attaching arrangement at the upper portion thereof, and a hollow half cylinder shaped bubble or elongated first cavity at the lower portion thereof. This first cavity is closed at one end and is open at the other end. A rigid plastic insert member comprises a mating half cylinder shape that is dimensioned to closely fit into the open end of the first cavity. The insert member includes an elongated bore, or second cavity, that extends generally coaxially of the insert member's half cylinder shape. This second cavity extends less than the entire axial length of the insert member, so as to form a second cavity having an open end. Dielectric cushioning material is placed in this second cavity, an electronic transponder is inserted into the second cavity, and the open end of the second cavity is then closed by a plastic end cap. The insert member is then inserted into the open end of the first cavity, cap end first. The above-mentioned cap and insert member are secured in position by the use of a bonding agent.

13 Claims, 1 Drawing Sheet

U.S. Patent      Oct. 31, 1995      5,461,807
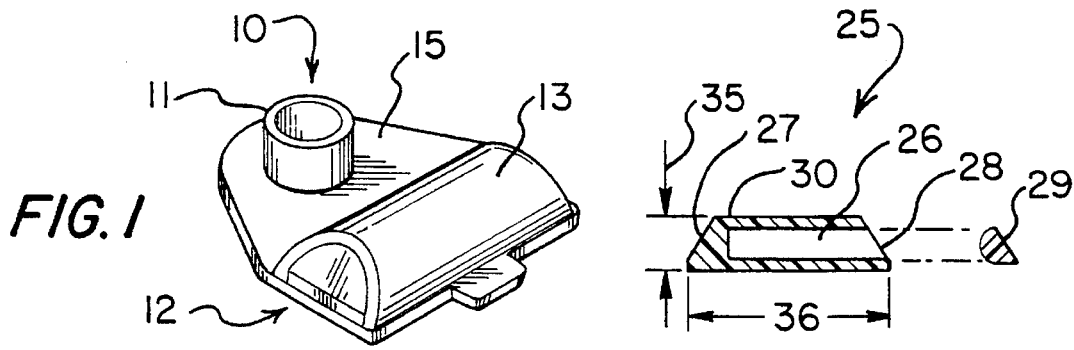
FIG. 1
FIG. 4
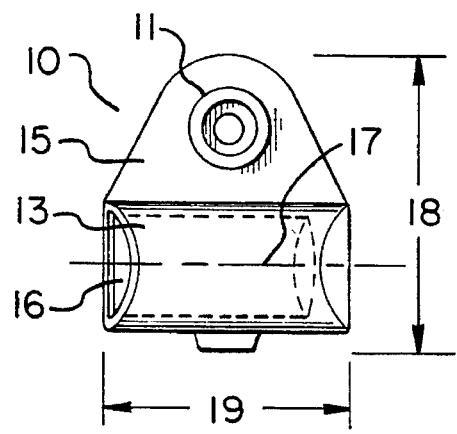
FIG. 2
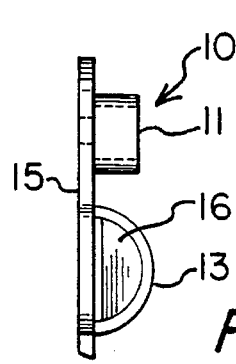
FIG. 3
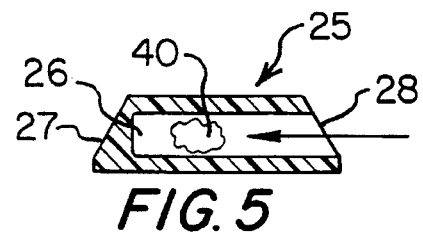
FIG. 5
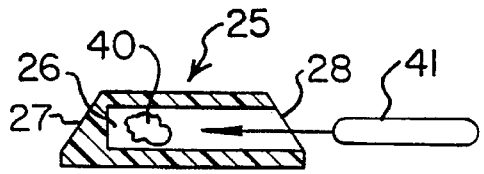
FIG. 6
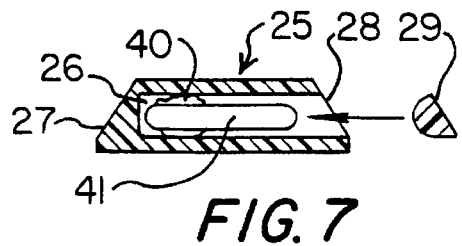
FIG. 7
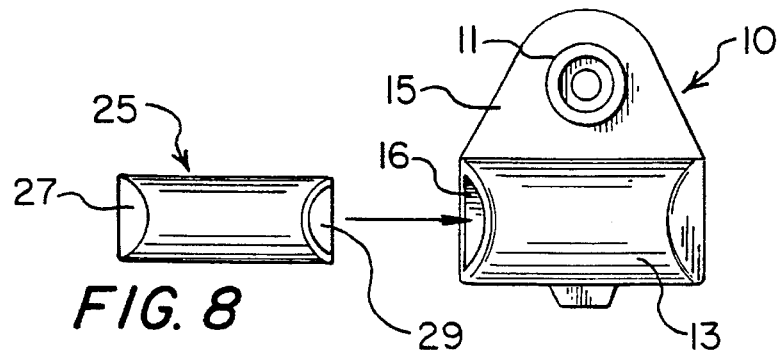
FIG. 8

ANIMAL EARTAG ELECTRONIC TRANSPONDER

BACKGROUND OF THE INVENTION

1. Field of the Invention

This invention relates to electronic identification devices, and more particularly to an electronic identification device that is constructed and arrange to be attached to an animal (for example, as an eartag).

2. Description of the Prior Art

The use of animal eartag transponders is generally known in the art. U.S. Pat. No. 4,718,697 is an example. In this patent, light weight polyurethane is used to form a cavity in which an electronic device is contained or housed. This cavity can be formed by the use of a hinged member, or by the use of a separate shell of hard material.

U.S. Pat. No. 4,854,328 describes an animal monitoring system wherein an eartag includes a female body portion that houses a receiver, a power source and visual indicators.

Other patents of general interest in the field of animal eartags include U.S. Pat. Nos. 4,049,950, 4,359,015, 4,612,877, 4,617,876, 4,635,389, 4,653,208, 4,857,893, 5,024,013, 5,028,918 and PCT published application WO 93/22907.

While the art as exemplified by the above publications is generally suitable for their limited intended purposes, the need remains in the art for an animal eartag electronic transponder of improved construction, arrangement, and utility.

SUMMARY OF THE INVENTION

This invention provides a flexible animal eartag that houses a passive electronic transponder; i.e., no battery power source is provided. The transponder is sealed within an electrically nonconductive plastic eartag, the transponder consisting of an encapsulated antenna and microchip arrangement. While the invention is not to be limited thereto, it is preferred that the transponder be of the type described in U.S. Pat. No. 5,211,129, incorporated herein by reference.

A portable hand-held data collecting computer may be used to interrogate or scan this eartag, to thus automate the collection and retrieval of animal information in a barn, corral or field.

An eartag in accordance with the invention comprises a generally flat and flexible plastic body member that includes an ear attaching structure at the upper portion thereof, and a hollow and elongated bubble or first elongated cavity at the lower portion thereof. This elongated first cavity is preferably formed as a half cylinder that is closed at one end and open at the other end. A mating elongated and rigid plastic insert member, preferably in the form of a mating elongated half cylinder, is dimensionally shaped to closely fit into the open end of the first cavity, and to substantially fill the first cavity. The insert member contains an elongated bore or second cavity that extends generally coaxially of this member's half cylinder shape. This second cavity extends less than the entire axial length of the insert member, so as to form a second cavity having an open end. Cushioning material is placed in this second cavity, an electronic transponder of the type described in the above-referenced patent is inserted into the second cavity, and the open end of the second cavity is then closed by a plastic end cap. The insert member is then inserted into the open end of the first cavity, cap end first. The above-mentioned cap and insert member are preferably secured in position by the use of a bonding agent, to thus form a sealed structure.

Among the many features of the invention is that a flexible plastic body member provides a flexible carrier that allows the eartag to survive as an animal eartag, wherein the body portion operates to carry a rigid plastic insert member in a snag resistant bubble portion of the body member, the rigid plastic insert member operating to protect the transponder that is housed therein. The rigid insert member prevents transponder failure due to crushing, twisting, bending, and the like, as is usually experienced in the very adverse animal environment.

These and other features, advantages and objects of the invention will be apparent to those of skill in the art upon reference to the following detailed description of the invention, which description makes reference to the drawing.

BRIEF DESCRIPTION OF THE DRAWING P

FIG. 1 is a perspective view of an animal eartag in accordance with the invention.

FIG. 2 is a top view of the eartag of FIG. 1.

FIG. 3 is a left side view of the eartag of FIG. 2.

FIG. 4 is a side view of the rigid insert member that forms an internal portion of the eartag of FIGS. 1, 2 and 3.

FIGS. 5–7 show the sequence steps of assembling the insert member of FIG. 4, FIG. 5 showing the insertion of cushioning material into the cavity within the insert member, FIG. 6 showing the insertion of an electronic transponder into the cavity within the insert member, and FIG. 7 showing the placement of an end cap into the open end of the cavity within the insert member.

FIG. 8 shows the manufacturing step of inserting the assembled insert member of FIG. 7 into the flexible body member of the eartag shown in FIGS. 1–3.

DETAILED DESCRIPTION OF THE INVENTION

The present invention provides a physically compact animal eartag of improved construction that houses a passive electronic transponder for use in the identification of an animal by a compatible low frequency radio wave reading system. The size and flexibility of an eartag in accordance with the invention allows the eartag to be inserted in an animal's ear, thus minimizing subsequent damage and pull-out of the eartag.

FIG. 1 is a perspective view of an eartag 10 in accordance with the invention. This eartag includes a female ear attachment portion 11 of conventional design. For example, attachment portion 11 may be of the type commercially known by the brand name Du Flex.

The lower portion 12 of eartag 10 comprises an integral, elongated, bubble-like housing 13 that contains the passive electronic transponder of the invention.

FIG. 2 is a top view of the device of FIG. 1, and FIG. 3 is a right side view of the device of FIG. 2. As can be seen from these figures, eartag 10 is formed of a generally flat and flexible plastic body member 15 that includes an integral ear attaching arrangement 11 at the upper portion thereof, and an integral, hollow, snag resistant, half cylinder shaped bubble or first cavity 16 at the lower portion thereof. Cavity 16 is contained within bubble-like housing 13. This first cavity 16 is closed at left hand end thereof, as shown in FIG. 2, and is open at the right hand end thereof. While not critical to the invention, cavity 16 is formed as an elongated half cylinder having a generally horizontally extending axis 17.

The vertical dimension 18 of physically compact eartag 10 is about 1.776 inches, the horizontal dimension 19 of the eartag is about 1.375 inches, the radius of housing 13 is about 0.331 inch, and the thin planar portion of body member 15 is about 0.080 inch thick.

In accordance with the invention, cavity 16 of FIGS. 2 and 3 is filled and sealed by the use of an insert member that holds an electronic transponder of the type described in the U.S. Pat. No. 5,211,129. FIG. 4 is a side view of this rigid plastic insert member 25. Insert member 25 comprises a mating half cylinder shape that is physically dimensioned to closely fit into the open end of first cavity 16. Insert member 25 includes an elongated bore or second cavity 26 that extends generally coaxially of the insert member's half cylinder shape. Second cavity 26 extends less than the entire axial length of insert member 25, so as to form a second cavity 26 having a closed end 27 and an open end 28. A plastic cap 29 is provided to close cavity 26 once the transponder has been inserted therein, as will be described. The vertical height 35 of insert member 26 is about 0.290 inch, and its horizontal length 36 is about 1,125 inches.

Insert member 25, and particularly its left hand end 30, are dimensionally shaped to closely fit into the open end of first cavity 16, so as to substantially close the open end of cavity 16, as is shown in FIGS. 1 and 2.

Preferably, body member 15 comprises a generally flat body member formed of a flexible and electrically nonconductive plastic, insert member 25 comprises a rigid plastic insert member, cap 29 comprises a rigid plastic cap formed of the same plastic as is insert member 25, first cavity 16 and second cavity 26 are elongated cavities each having respective elongated axes that are generally in positional coincidence, and first cavity 16 and insert member 25 are formed as mating elongated half cylinders such that insert member 25 substantially fills first cavity 16. An example of a suitable plastic material for body member 15 is the brand Dow 2102-85A or 90A weather resistant elastomer. An example of a suitable plastic material for insert member 25 and cap 29 is the brand Dow Isoplast 101 LGF, a glass filled polycarbonate.

FIGS. 5–7 show the sequence steps of assembling insert member 25. As a first step in this process, as shown in FIG. 5, cushioning material 40 is inserted into cavity 26 within insert member 25. For example, cushioning material 40 may be a dielectric putty whose function is to hold transponder 41 physically in a nonmovable position in cavity 26.

Once cushioning material 40 is inserted into cavity 26, a passive electronic transponder 41, preferably of the type described in the above-referenced patent, is inserted into cavity 26, as shown in FIG. 6. As a final step in the assembly of insert member 25, cap 29 is placed so as to close and seal the open end 28 of cavity 26, as shown in FIG. 7.

Once insert member 25 has been assembled as shown in FIG. 7, the completed insert member 25 is inserted into cavity 16, cap 29 end first, as shown in FIG. 8. While not critical to the invention, it is preferred that cap 29 be sealed to opening 28, and that the closed end portion 27 of insert 25 be sealed to cavity 16 (for example, by the use of a compatible bonding agent, or the like).

The invention has been described in detail while making reference to preferred embodiments thereof. It is recognized that those skilled in the art will readily visualize yet other embodiments of the invention that are clearly within the spirit and scope of the invention. Thus, it is intended the the above detailed description not be taken as a limitation on the spirit and scope of the invention.

What is claimed is:

1. An animal eartag for use in electronically identifying an animal, comprising:

a body member having an ear attaching structure at one portion thereof, and having a first cavity at a second portion thereof;

said first cavity having an open end and a closed end;

an insert member in said first cavity;

said insert member being dimensionally shaped to closely fit into said open end of the first cavity so as to substantially close said open end of said first cavity;

a second cavity in said insert member;

said second cavity having an open end and a closed end;

said insert member being placed in said first cavity with said open end of said second cavity being positioned adjacent the closed end of said first cavity; and an electronic transponder positioned inside said second cavity.

2. The eartag of claim 1 wherein said body member is formed of a flexible material, and wherein said insert member is formed of a rigid material.

3. The eartag of claim 2 wherein said body member is formed of a weather resistant elastomer, and wherein said insert member is formed of a polycarbonate.

4. The eartag of claim 1 including:

cushioning material supporting said transponder in said second cavity.

5. The eartag of claim 1 including:

a cap sealing said open end of said second cavity.

6. The eartag of claim 1 wherein said transponder comprises a passive electronic device having no power supply, said eartag including cushioning material supporting said electronic device in said second cavity, and a cap sealing said open end of said second cavity.

7. The eartag of claim 6 wherein:

said body member comprises a generally flat body member formed of an electrically nonconductive and flexible plastic;

said insert member comprises a rigid plastic insert member formed of an electrically nonconductive plastic;

said cap comprises a rigid plastic cap formed of an electrically nonconductive plastic; and said first cavity and said second cavity are elongated cavities each having respective elongated axes that are generally in positional coincidence.

8. The eartag of claim 7 wherein:

said first cavity and said insert member are formed as mating elongated half cylinders such that said insert member substantially fills said first cavity.

9. The eartag of claim 8 wherein said insert member and said cap are secured in position by the use of a bonding means.

10. The eartag of claim 1 wherein:

said body member and said insert member are formed of an electrically nonconductive plastic.

11. The eartag of claim 10 wherein:

said first cavity and said insert member are formed as mating elongated half cylinders such that said insert member substantially fills said first cavity;
said body member is flexible; and
said insert member is rigid.

12. The eartag of claim 11 wherein said insert member is secured in position by the use of bonding means.

13. The eartag of claim 12 including:

dielectric cushioning material supporting said transducer in said second cavity.

* * * * *